United States Patent
Liu et al.

(10) Patent No.: US 9,734,845 B1
(45) Date of Patent: Aug. 15, 2017

(54) MITIGATING EFFECTS OF ELECTRONIC AUDIO SOURCES IN EXPRESSION DETECTION

(71) Applicant: Amazon Technologies, Inc., Seattle, WA (US)

(72) Inventors: Yue Liu, Milpitas, CA (US); Praveen Jayakumar, Fremont, CA (US); Amit Singh Chhetri, Santa Clara, CA (US); Ramya Gopalan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/752,400

(22) Filed: Jun. 26, 2015

(51) Int. Cl.
G10L 25/78 (2013.01)
G10L 15/00 (2013.01)
H04R 3/00 (2006.01)
H04R 1/40 (2006.01)

(52) U.S. Cl.
CPC ............ G10L 25/78 (2013.01); G10L 15/00 (2013.01); H04R 1/406 (2013.01); H04R 3/005 (2013.01)

(58) Field of Classification Search
None
See application file for complete search history.

(56) References Cited

U.S. PATENT DOCUMENTS

| | | | | |
|---|---|---|---|---|
| 9,111,542 B1* | 8/2015 | Hart | | G10L 21/00 |
| 2003/0065655 A1* | 4/2003 | Syeda-Mahmood | | G06F 17/30017 |
| 2004/0220800 A1* | 11/2004 | Kong | | G10L 21/0208 704/205 |
| 2005/0049864 A1* | 3/2005 | Kaltenmeier | | G10L 15/20 704/233 |
| 2005/0060142 A1* | 3/2005 | Visser | | G10L 21/0208 704/201 |
| 2005/0096898 A1* | 5/2005 | Singhal | | G10H 1/125 704/205 |
| 2009/0164212 A1* | 6/2009 | Chan | | G10L 21/0208 704/226 |
| 2009/0299739 A1* | 12/2009 | Chan | | H04R 3/005 704/225 |

(Continued)

OTHER PUBLICATIONS

Kim, Hyun-Don, et al. "Two-channel-based voice activity detection for humanoid robots in noisy home environments." Robotics and Automation, 2008. ICRA 2008. IEEE International Conference on. IEEE, 2008.*

Primary Examiner — Pierre-Louis Desir
Assistant Examiner — Jonathan Kim
(74) Attorney, Agent, or Firm — Lee & Hayes, PLLC

(57) ABSTRACT

In a speech-based system, a wake word or other trigger expression is used to preface user speech that is intended as a command. The system receives multiple directional audio signals, each of which emphasizes sound from a different direction. The signals are monitored and analyzed to detect the directions of interfering audio sources such as televisions or other types of electronic audio players. One of the directional signals having the strongest presence of speech is selected to be monitored for the trigger expression. If the directional signal corresponds to the direction of an interfering audio source, a more strict standard is used to detect the trigger expression. In addition, the directional audio signal having the second strongest presence of speech may also be monitored to detect the trigger expression.

23 Claims, 4 Drawing Sheets

(56) References Cited

U.S. PATENT DOCUMENTS

| | | | | | |
|---|---|---|---|---|---|
| 2009/0299742 A1* | 12/2009 | Toman | G10L 21/0208 704/233 |
| 2010/0017205 A1* | 1/2010 | Visser | G10L 21/02 704/225 |
| 2011/0264447 A1* | 10/2011 | Visser | G10L 25/78 704/208 |
| 2011/0288860 A1* | 11/2011 | Schevciw | G10L 25/78 704/233 |
| 2012/0062729 A1* | 3/2012 | Hart | G06F 1/1626 348/135 |
| 2012/0099732 A1* | 4/2012 | Visser | G10L 21/0272 381/17 |
| 2012/0128187 A1* | 5/2012 | Yamada | H04R 25/407 381/313 |
| 2012/0154400 A1* | 6/2012 | Steen | G06T 15/08 345/424 |
| 2012/0224456 A1* | 9/2012 | Visser | G01S 3/8006 367/127 |
| 2012/0224715 A1* | 9/2012 | Kikkeri | H04R 3/005 381/92 |
| 2013/0030803 A1* | 1/2013 | Liao | G10L 15/20 704/233 |
| 2013/0272539 A1* | 10/2013 | Kim | G01S 3/8006 381/92 |
| 2013/0307771 A1* | 11/2013 | Parker | G06F 3/013 345/158 |
| 2013/0332163 A1* | 12/2013 | Onishi | G10L 25/93 704/236 |
| 2013/0332168 A1* | 12/2013 | Kim | G10L 15/22 704/251 |
| 2014/0114665 A1* | 4/2014 | Murgia | G10L 21/0216 704/275 |
| 2014/0163978 A1* | 6/2014 | Basye | G10L 15/28 704/233 |
| 2014/0219471 A1* | 8/2014 | Deshpande | H04R 3/005 381/92 |
| 2014/0278393 A1* | 9/2014 | Ivanov | G10L 15/20 704/233 |
| 2014/0278394 A1* | 9/2014 | Bastyr | G10L 21/0208 704/233 |
| 2014/0278416 A1* | 9/2014 | Schuster | G10L 15/32 704/246 |
| 2014/0350924 A1* | 11/2014 | Zurek | G10L 15/22 704/231 |
| 2015/0066500 A1* | 3/2015 | Gomez | G10L 15/20 704/233 |
| 2015/0106085 A1* | 4/2015 | Lindahl | G10L 15/32 704/231 |
| 2015/0365759 A1* | 12/2015 | Dimitriadis | G06K 9/00684 381/71.1 |
| 2016/0125867 A1* | 5/2016 | Jarvinen | H04S 7/30 381/73.1 |

* cited by examiner

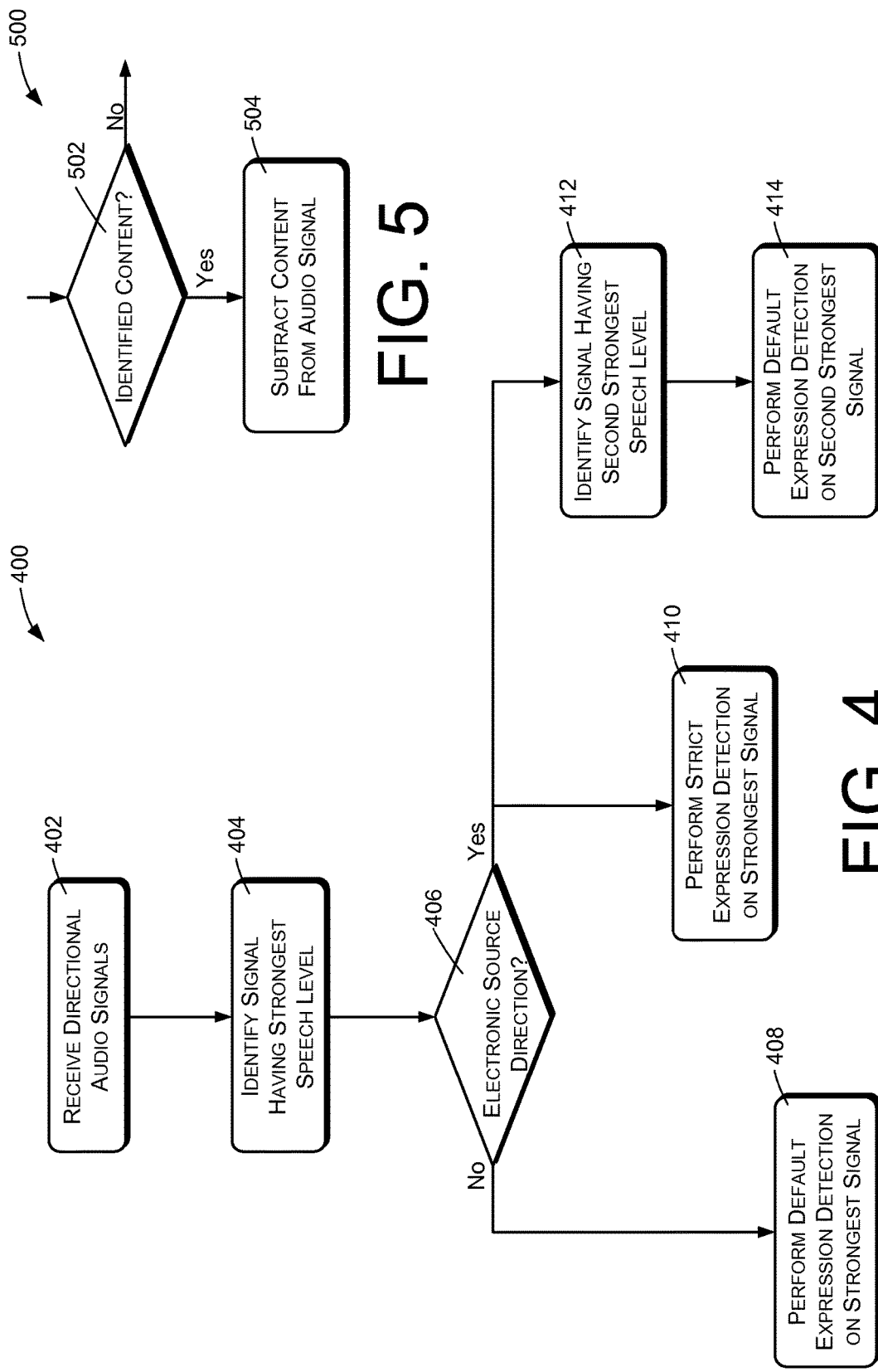

MITIGATING EFFECTS OF ELECTRONIC AUDIO SOURCES IN EXPRESSION DETECTION

BACKGROUND

Certain types of devices and services may interact with users through speech. A typical user environment, however, may contain sources of interfering sound that make it difficult to isolate user speech and to recognize and understand the user speech. In particular, a user environment may contain one or more media sources such as televisions, radios, or other audio devices that generate interfering sound.

BRIEF DESCRIPTION OF THE DRAWINGS

The detailed description references the accompanying figures. In the figures, the left-most digit(s) of a reference number identifies the figure in which the reference number first appears. The use of the same reference numbers in different figures indicates similar or identical components or features.

FIG. 4 is a flow diagram illustrating another example method of expression detection that accounts for sound generated by electronic source of sounds.

FIG. 5 is a flow diagram illustrating an example of processing an audio signal to remove identifiable audio content from the audio signal.

DETAILED DESCRIPTION

Figure 1:
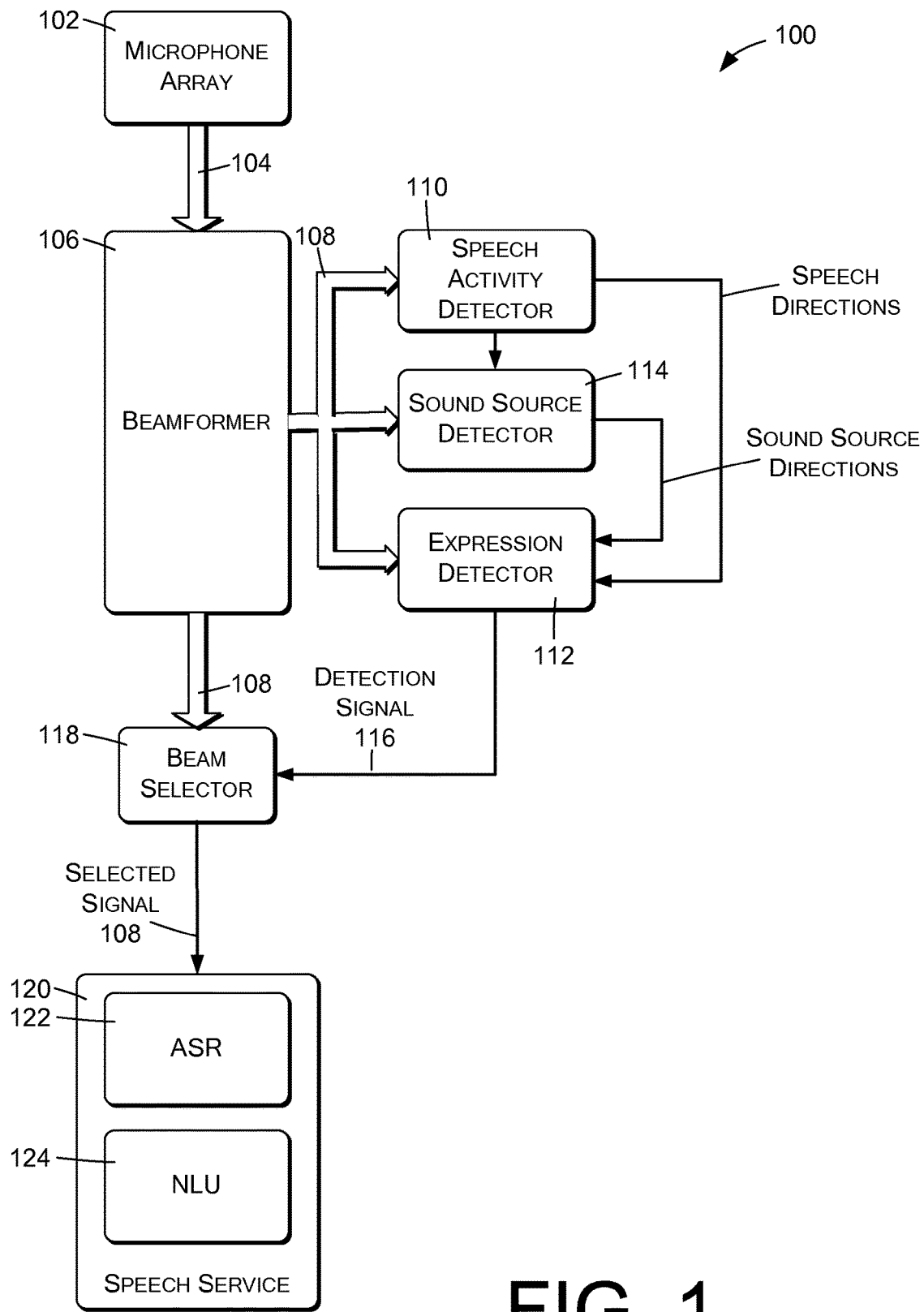
FIG. 1 is a block diagram of a system that performs speech recognition and language understanding based on user commands that are prefaced by a trigger expression.

This disclosure pertains generally to a speech interface device or other audio device that facilitates speech-based interactions with a user. The audio device has a microphone array and a loudspeaker. The microphone array captures user speech and the loudspeaker plays responsive speech.

Spoken user commands directed to the audio device are prefaced by a wake word, which is more generally referred to herein as a trigger expression. In response to detecting the trigger expression, the audio device or an associated service interprets any immediately following words or phrases as actionable speech commands.

The audio device has an audio beamformer that produces directional audio signals, each emphasizing sound from a corresponding different direction. A speech activity detector analyzes the directional audio signals to identify one or more of the directional audio signals that contain human speech. An expression detector analyzes the identified directional audio signals to detect spoken utterances of the trigger expression.

In some situations, an electronic source of sound such as a television, radio, or other audio device may produce sound that contains speech. The speech produced by the electronic source of sound may be detected by the speech activity detector and in some cases the trigger expression may be detected in the sound produced by the electronic source of sound device. This is an undesirable outcome, because only trigger expressions spoken by an actual human who is present in the environment of the audio device should be detected.

In order to avoid detection of the trigger expression based on sound produced by a non-human source, the audio device is configured to monitor its environment to detect the directions or locations of fixed, non-human sound sources such as electronic media devices. In described embodiments, the audio device analyzes each of its directional audio signals to detect sound that has likely been generated by an electronic device such as a television, radio, or other audio system that may contain representations of human speech. Specifically, each directional audio signal is analyzed to detect the presence over time of sound having certain characteristics tending to indicate that the sound has originated from an electronic source rather than being produced by a human who is present and near the audio device. For example, the audio device may identify sound that contains speech but that also contains a wider range of frequencies than typically found in human speech. If sound such as this is found in an audio signal consistently, over time, the audio device may assume that there is an electronic source of sound in the direction of the directional audio signal.

When speech is detected in a directional audio signal, subsequent expression detection uses different expression detection standards, depending on whether there is a detected electronic source of sound in the same direction. If the directional audio signal has not been flagged as corresponding to the direction of an electronic source of sound, a default detection standard is applied during the expression detection. If the directional audio signal has been flagged as corresponding to the direction of an electronic source of sound, however, a different, more stringent detection standard is applied during the expression detection. The more stringent detection standard may have the effect of decreasing the sensitivity of the expression detector and thereby decreasing the number of false detections that may otherwise result from the sound produced by an electronic source of sound. In some cases, the more stringent detection standard may comprise a different detection algorithm, such as one that requires the user to repeat the trigger expression before it is recognized as a valid utterance of the trigger expression.

In some embodiments, the audio device may be configured to listen for the trigger expression in the directional audio signal that has the highest detected level of speech presence. When this directional audio signal corresponds to the direction of an electronic source of sound, however, the audio device may also listen to the directional audio signal having the second highest level of speech presence. A default detection standard may be used for detecting the trigger expression in the audio signal having the second highest level of speech presence, while a more strict or stringent standard may be used for detecting the trigger expression in the audio signal having the first highest level of speech presence, corresponding to the direction of the electronic source of sound.

FIG. 1 shows elements of a system or device 100 that receives and responds to voice commands. The system or device 100 has a microphone array 102 that captures sound from the environment of the system 100. The sound may contain user speech. The speech may contain a trigger expression that has been spoken by a user as an indication that subsequent speech is directed to the device 100. The trigger expression may comprise a word, a phrase, or a sound. In some cases, the trigger expression may comprise a wake word that is intended to cause a device or system to move from a low power consumption and low functionality state to a normal operating state. In some cases, the trigger expression may cause the device or system to analyze subsequent speech and to conduct a dialog with the user in order to determine and act upon an intent that is being expressed by the user.

The microphone array 102 has multiple microphone elements that are spaced from each other so that they can be used for audio beamforming. The microphone array 102 produces multiple microphone audio signals 104 corresponding respectively to the microphone elements of the microphone array 102.

The system or device 100 includes an audio beamformer or beamforming component 106. The audio beamformer 106 receives the microphone audio signals 104 and processes them to produce multiple directional or directionally-focused audio signals 108. Each directional audio signal 108 corresponds to one of multiple different beam directions. Each directional audio signal emphasizes sound from its corresponding beam direction. In the described embodiment, the directional audio signals 108 correspond respectively to and emphasize sound from different radial beam directions relative to the microphone array 102. In other embodiments, the audio signals may correspond to and may emphasize sound from different areas of the environment.

Any given directional audio signal 108 may contain speech spoken by a user who is in the environment of the audio device 100 and who is in the beam direction of the directional audio signal 108. A given directional audio signal may also receive sound produced by a non-human sound source such as an electronic media device. The sound produced by the non-human sound source may also contain a representation of human speech.

Audio beamforming, also referred to as audio array processing, uses multiple omnidirectional microphone elements that are spaced from each other at known distances. Sound originating from a sound source is received by each of the microphone elements. However, because each microphone element is at a different distance from the sound source, a propagating sound wave arrives at the microphone elements at slightly different times. The difference in arrival time results in phase differences between audio signals produced by the microphone elements. The phase differences can be exploited to enhance or amplify sounds originating from chosen directions relative to the microphone array.

More specifically, audio beamforming uses signal processing techniques to combine signals from the different microphone elements so that sounds originating from a particular direction are emphasized or amplified while sounds originating from other directions are deemphasized or attenuated. In particular, signals from the different microphones are combined in such a way that sounds from a particular direction experience constructive interference, while sounds from other directions experience destructive interference. The parameters used in beamforming may be varied to dynamically select different directions, even when using a fixed-configuration microphone array.

In certain implementations, a potentially different delay is added to each microphone signal so that sounds from a particular direction become aligned in time. These delayed signals are then summed. A beamformer such as this is referred to as having a delay-sum architecture. The amount of delay for each microphone signal is determined based on the known spatial relationships of the microphones and the direction from which sounds are to be emphasized. The delays can be changed over time to receive sounds from different directions.

The system or device 100 has a speech activity detector 110 that detects the level of human speech presence in each of the directional audio signals 108. The level of speech presence is detected by analyzing a portion of an audio signal to evaluate features of the audio signal such as signal energy and frequency distribution. The features are quantified and compared to reference features corresponding to reference signals that are known to contain human speech. The comparison produces a score corresponding to the degree of similarity between the features of the audio signal and the reference features. The score is used as an indication of the detected or likely level of speech presence in the audio signal. The speech activity detector 110 may be configured to continuously or repeatedly provide the level of speech presence for each of the directional audio signals 108 over time. Accordingly, levels of speech presence may include levels corresponding to past times or time periods and/or may include current levels.

The system 100 has an expression detector 112 that receives and analyzes the directional audio signals 108 to detect a predefined word, phrase, or other sound. In the described embodiment, the expression detector 112 is configured to detect a representation of a wake word or other trigger expression in one or more of the directional audio signals 108. Generally, the expression detector 112 analyzes an individual directional audio signal 108 in response to an indication from the speech activity detector 110 that the directional audio signal 108 contains a certain level of speech presence.

The expression detector 112 may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In certain embodiments, the expression detector 112 may be configured to analyze one or more of the directional audio signals 108 to produce a score indicating a likelihood that a trigger expression is represented in the directional audio signal 108. The expression detector 112 then compares the score to a threshold to determine whether the trigger expression will be declared as having been spoken.

In some cases, a keyword spotter may use simplified ASR (automatic speech recognition) techniques. For example, the expression detector 112 may use a Hidden Markov Model (HMM) recognizer that performs acoustic modeling of the directional audio signals 108 and compares HMM models of the directional audio signals 108 to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models.

The expression detector 112 may also use a support vector machine (SVM) classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of an audio signal represents an utterance of the trigger expression.

In some implementations, the speech activity detector 110 may determine which of the multiple directional audio signals 108 has the highest speech presence at any given time, and the expression detector 112 may analyze that directional audio signal 108 for detection of the trigger expression. Thus, at any given time, expression detection is being performed on the single one of the directional audio signals 108 that has the highest level of speech presence as evaluated by the speech activity detector 110. In some situations, as will be described in more detail below, the speech activity detector 110 may identify the directional audio signal 108 having the highest level of speech presence and may also identify the directional audio signal 108 having the second highest level of speech presence. In these situations, the expression detector 112 may perform expression detection on both of the identified directional signals, using different confidence thresholds or different criteria. For example, a more stringent and less sensitive criteria may be used for expression detection on the audio signal having the highest level of speech presence and a less stringent and more sensitive criteria may be used for expression detection on the audio signal having the second highest level of speech presence.

The system 100 also has a sound source detector 114 that is configured to identify one or more of the beamformer beam directions in which an electronic source of sound or other fixed, non-human sound source is located. In certain embodiments, the sound source detector 114 is configured to identify the beam direction by determining whether the directional audio signal 108 corresponding to the beam direction contains sound having certain characteristics over time, such as might be produced by a non-human source. For example, the sound source detector might identify a beam direction from which continuous speech is received for a significant period of each day, and might as a result conclude that the speech is being produced by an electronic source rather than a human source.

Non-human sound sources may include various types of audio and/or audio-visual equipment that produce sound using loudspeakers, such as televisions, radios, and media players, home entertainment systems, theater systems, audio/visual equipment, speakerphones, etc. Equipment such as this typically receives content from content sources such as terrestrial or cable broadcast networks, Internet or other network-based services, physical media such as a hard disks, CD-ROM, flash memory derive, etc., and other sources. The sound produced by the sound sources may include representations of human speech.

The sound source detector 114 analyzes each directional audio signal 108 to determine whether the audio signal has characteristics of a non-human or electronic source. As one example, the sound source detector 114 may monitor the levels of speech presence produced by the speech activity detector 110 over time to determine whether past levels of speech presence have exceeded a level threshold for at least a threshold amount of time during a past time period. Similarly, the sound source detector 114 may monitor speech presence levels to determine whether a particular directional audio signal contains continuous speech for a given length of time or for multiple time periods throughout a day or over the course of several days. As a more specific example, the sound source detector 114 may detect that speech originates every day from a particular direction for a time period, wherein the time period is of at least a threshold length. Similarly, the sound source detector 114 may detect that sound or speech is present during multiple time periods that occur within an encompassing time period of no more than a predefined length such as a day or a number of days, wherein each of the multiple time periods is of at least a threshold length. The threshold length may comprise 30 minutes, as one example.

In addition to determining whether speech occurs in particular directional audio signal over time, the source detector 114 may also determine whether the sound represented by the particular directional audio signal has particular audio frequency characteristics that may be associated with electronically generated sound. Electronically generated sound, for example, may contain a wider range of audio frequencies than uttered speech. Accordingly, if a directional audio signal contains speech and has a relatively large frequency range (i.e., a range of frequencies outside the typical frequency range of human speech), and the sound is received consistently or repeatedly over a given time period, the electronic source of sound detector 114 may conclude that the sound has been generated by a non-human source at a fixed location that is located in the beam direction corresponding to the directional audio signal.

Note that in some embodiments, the function of the sound source detector 114 may be performed by other means, such as by receiving and recording explicit information from a user regarding the directions of non-human sound sources. For example, a user may provide configuration information regarding locations of non-human sound sources. Similarly, a user may position themselves near a non-human sound source and speak a command or statement indicating that the non-human sound source is in the same direction as the user. As a further example, the system 100 may in some cases control the non-human sound source and may have the ability to turn the sound source on and off and/or to cause the sound source to play specific sounds that can be uniquely identified. In cases such as this, the audio device may command the non-human sound source to produce identifiable sound and may detect and record the direction from which the sound was received.

The expression detector 112 is configured to receive information from the sound source detector 114 regarding the directions of detected non-human sound sources and to exploit this information in order to reject or avoid detections of trigger expressions produced by the non-human sound sources. Specifically, the expression detector 112 receives an indication of which directional audio signals 108 correspond to the directions of non-human sound sources. When a directional audio signal 108 corresponds to the direction of a detected non-human sound source, the expression detector 112 applies a relatively higher or more stringent standard when performing expression detection, effectively decreasing the sensitivity of the expression detector 112 in the directions corresponding to non-human sound sources.

As a specific example, the expression detector 112 may identify a first direction in which a currently occurring level of speech presence, as indicated by the speech activity detector 110, is the highest. The expression detector 112 may also determine that the first direction corresponds to the direction in which an electronic source of sound is located, based on information received from the sound source detector 114. Upon determining that the first direction, which corresponds to the highest level of speech presence, corresponds to the direction of the electronic source of sound, the expression detector 112 produces a first score indicating the likelihood that the trigger expression is represented in the directional audio signal corresponding to the first direction and compares the first score to a first threshold to determine whether the first score is greater than the first threshold.

The expression detector 112 may also identify a second direction in which a currently occurring level of speech presence, again as indicated by the speech activity detector 110, is the second highest. The expression detector 112 produces a second score indicating the likelihood that the trigger expression is represented in the directional audio signal corresponding to the second direction and compares the second score to a second threshold to determine whether the second score is greater than the second threshold, wherein the second threshold is less than the first threshold.

Upon determining that (a) the first score is greater than the first threshold or (b) the second score is greater than the second threshold, the expression detector concludes that the trigger expression has been uttered by a user who is present and in the vicinity of the audio device.

A higher or more stringent standard, to be used for signals corresponding to directions of non-human sound sources, may in some cases be represented by a higher confidence threshold used by the expression detector as described above. In other cases, a more stringent standard may be implemented by using a different detection algorithm that is optimized for the presence of an interfering sound source. For example a strict or more stringent algorithm might require the user to say the trigger expression twice within a short time period. As another example, a strict or more stringent algorithm may require that the trigger expression occur after a time period of relative silence.

Upon detecting a representation of the trigger expression in one of the directional audio signals 108 in accordance with the criteria discussed above, the expression detector 112 generates a detection signal 116. The detection signal 116 indicates that the trigger expression has been detected and identifies the directional audio signal 108 in which the trigger expression has been detected.

A beam selector 118 receives the detection signal and selects the directional audio signal indicated by the detection signal. The selected audio signal 108 is provided to a speech service 120 for understanding of subsequent user speech and for responding appropriately to such user speech.

The speech service 120 may include an automatic speech recognition (ASR) component 122 that recognizes speech represented in the selected directional audio signal 108. In contrast to the expression detector 112, which may sometimes be capable only of a binary decision regarding whether or not any given portion of an audio signal represents a predefined word or other expression, the ASR component 122 uses backward and forward context to create a full transcript of speech words represented in the selected directional audio signal 108, not limited to the detection of a particular word or other expression.

The speech service 120 may also include a natural language understanding (NLU) component 124 that determines a meaning of the speech. The NLU component 124 analyzes a word stream provided by the ASR component 122 and produces a representation of a meaning of the word stream. For example, the NLU component 124 may use a parser and grammar rules to analyze a sentence and to produce a representation of a meaning of the sentence in a formally defined language that conveys concepts in a way that is easily processed by a computer. The meaning may be semantically represented as a hierarchical set or frame of slots and slot values, where each slot corresponds to a semantically defined concept. NLU may also use statistical models and patterns generated from training data to leverage statistical dependencies between words in typical speech.

Figure 2:
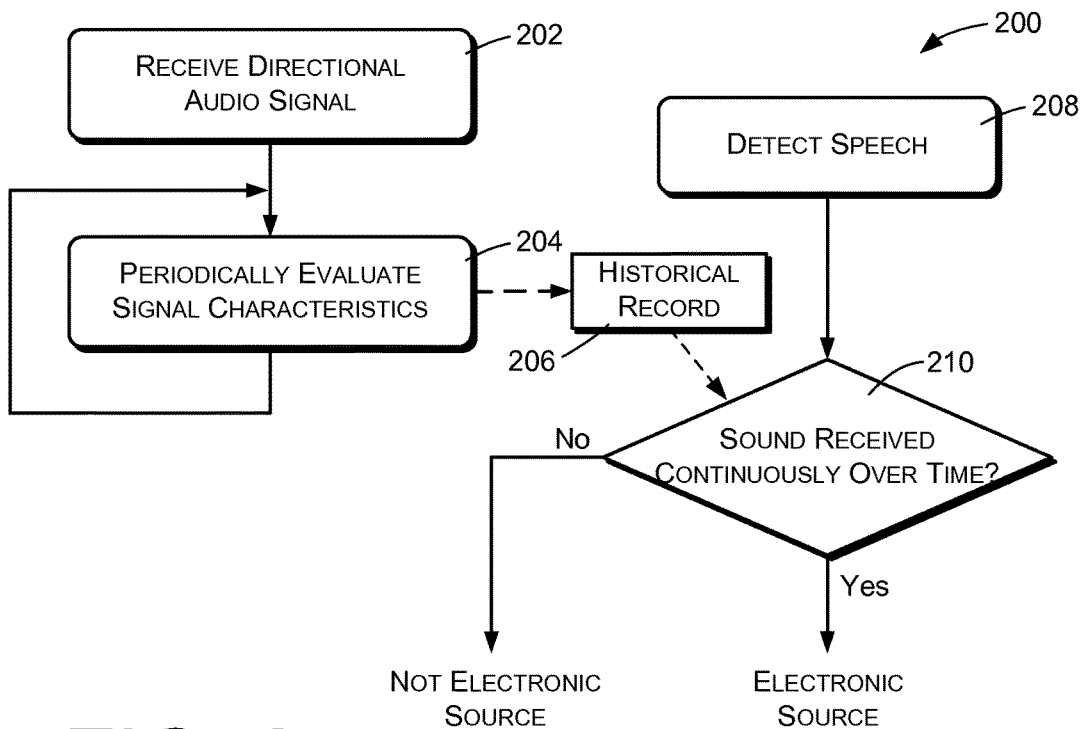
FIG. 2 is a flow diagram illustrating an example method of determining whether a given directional audio signal corresponds to the direction of an electronic source of sound.

FIG. 2 illustrates an example method 200 of determining whether one of the directional audio signals 108 represents sound from an electronic source of sound or other non-human sound source. In the context of FIG. 1, the method 200 may be performed by the sound source detector 114, with respect to the directional audio signals 108 corresponding to different directions relative to the device or system 100. The method 200 is performed independently with respect to each of the directional audio signals 108, to determine whether there is a non-human audio source any beam direction.

An action 202 comprises receiving one of the directional audio signals 108. An action 204 comprises periodically evaluating signal characteristics of the received directional audio signal. The action 204 may be performed as a background process at a time interval such as every minute. The results of the evaluation are recorded each time the action 204 is performed, to create a historical record 206 of the characteristics of the directional audio signal over time. For example, the historical record 206 may indicate, for a particular directional audio signal at each of multiple discrete past times, whether the signal had components of speech, the level of detected speech presence as provided by the speech activity detector 110, whether the energy of the signal exceeded a predetermined threshold, and whether the audio signal had frequency characteristics typical of or similar to electronically generated sound. For example, it may be assumed that naturally spoken human speech will have a frequency range of 300-4000 Hertz and that sound produced by an electronic source will have a wider range of frequencies. The action 204 may therefore comprise determining and recording whether the directional audio signal has wider frequency range than that of human speech and or whether the directional audio signal has frequencies outside the 300-4000 Hertz range.

Other techniques may be used in the action 204 to evaluate the directional audio signal. For example, more complex frequency analyses may be performed to determine whether the audio signal has characteristics of an electronic source. Furthermore, various types of data may be indicated by the historical record 206, in addition to the data elements described above.

Independently or in conjunction with the action 204, the speech activity detector 110 may detect speech in the directional audio signal in an action 208. The action 208 may in some cases comprise determining that the detected level of speech presence exceeds a threshold, for example. In response, an action 210 is performed of determining whether the directional audio signal has demonstrated characteristics of electronically generated sound over a given length of time. For example, the action 210 may comprise examining the historical record 206 to determine whether certain criteria were satisfied for all or most of a given preceding time period such as 10 minutes. The criteria, for example, may be that the directional audio signal has had at least a given signal strength and has had frequency characteristics typical of electronically generated sound for at least 80% of the discrete times for which data is recorded by the historical record 206 over a preceding time period. If the criteria are satisfied, the directional audio signal is flagged as corresponding to a beam direction in which an electronic source of sound or other non-human sound source is located. If the criteria are not satisfied, the directional audio signal is indicated as not corresponding to the direction of an electronic source of sound or other non-human sound source.

This information—whether or not a directional audio signal corresponds to a non-human sound source—is used when performing expression detection, as will described with reference to FIG. 3.

In some cases the criteria may be more complex. For example, the criteria may be that the directional audio signal demonstrate certain characteristics during multiple individual time periods that occur within a larger, encompassing time period. For example, the characteristics might be detected during multiple individual 30-minute time periods that occur within an encompassing time period of a day or several days. In some cases, the criteria may require that there be at least a threshold number of such individual time periods that occur during the encompassing time period. In some cases, the criteria may require that the individual time periods be distributed somewhat evenly over the course of the encompassing time period, such as at least one individual time period occurring during every 24 hour period of the encompassing time period. Various different criteria may be devised, based on listening habits of users within a home.

The signal characteristics specified by the criteria may comprise any combination of the characteristics described above, including signal strength, speech presence, and frequency characteristics. For the characteristics to be judged as being present during an individual time period, the sound source detector may determine that the characteristics are present for a threshold percentage (80%, for example) of the discrete times for which data is recorded by the historical record 206 over the individual time period.

Figure 3:
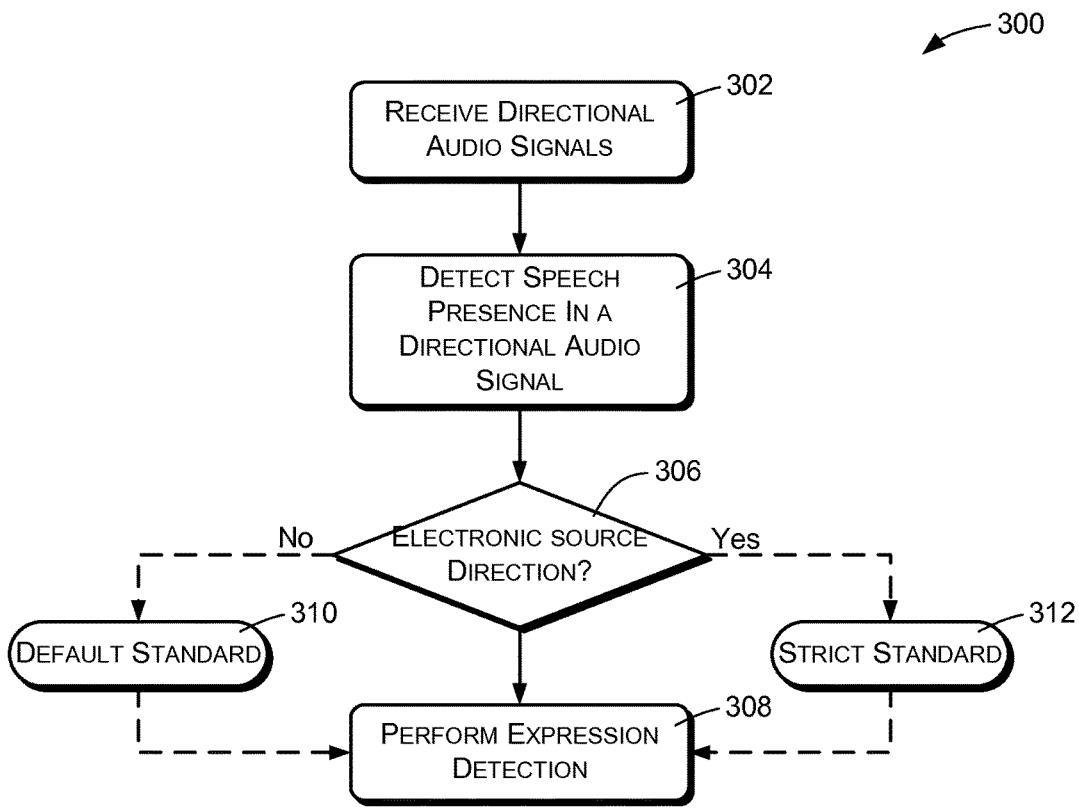
FIG. 3 is a flow diagram illustrating an example method of expression detection that accounts for sound generated by electronic source of sounds.

FIG. 3 illustrates an example method 300 of performing expression detection. In the context of FIG. 1, the method 300 may be performed by the speech activity detector, the expression detector 112, and/or the sound source detector 114.

An action 302 comprises receiving directional audio signals 108. In the described embodiment, the directional audio signals 108 are received by the speech activity detector 110 from the beamformer 106.

An action 304 comprises detecting speech presence in one of the directional audio signals. For example, this action may be performed by the speech activity detector 110. In certain implementations, the evaluated level of speech presence may be compared to a threshold, where speech is determined to have occurred when the speech activity level exceeds the threshold.

An action 306 comprises determining whether the directional audio signal in which speech has been detected corresponds to a beam direction in which a non-human sound source is located. As an example, the action 306 may comprise receiving information regarding the beam directions of non-human sound sources from the sound source detector 114. In some cases, the action 306 may correspond to or comprise the action 210 of FIG. 2, performed by the sound source detector 114, which comprises determining whether sound having certain characteristics has been detected in the directional audio signal over a given length of time.

An action 308, which comprises performing expression detection by the expression detector 112, is performed after the action 306 of determining whether the directional audio signal corresponds to a beam direction in which a non-human sound source is located. If the directional audio signal does not correspond to the direction of an electronic source of sound, the action 308 is performed using a default detection standard 310. If the directional audio signal does correspond to the direction of an electronic source of sound, the action 308 is performed using strict detection standard 312.

In some embodiments, the default and strict standards may correspond to different confidence thresholds used by the expression detector 112. For example, the default standard may correspond to a first, relatively low confidence threshold and the strict standard may corresponds to a second, relatively higher confidence threshold. Accordingly, a higher level of confidence may be required when performing expression detection with respect to any directional audio signal that corresponds in direction to the location of a non-human sound source.

In other embodiments, the default and strict standards 310 and 312 may represent different expression detection algorithms. For example a first detection algorithm may be used when detecting a trigger expression in an audio signal that contains sound from a non-human sound source and a second, different detection algorithm may be used when detecting a trigger expression in an audio signal that does not contain sound from a non-human sound source. The first algorithm may be designed for the particular situation in which it is known that the audio signal contains sounds from non-human sources and may thus produce more reliable results in that situation. For example, the first algorithm may ignore single utterances of the trigger expression and instead respond only to situations in which at least two utterances of the trigger expression are detected within a relatively short time period. In some cases, the system or device 100 may be configured to prompt the user by speech to repeat the trigger expression. As another example, a strict detection algorithm may ignore detections of the trigger expression that are not preceded by a period of relative silence, and may instead declare the occurrence of the trigger expression only when it occurs after a period of time during which sound or speech was not detected. Similarly, a strict detection algorithm may ignore detections of the trigger expression that occur within the middle of recognized sentences, rather than at the start of sentences.

FIG. 4 illustrates an example method 400 that may be used in the system or device 100 to detect a valid trigger expression that has been spoken by a person who is in the environment of the system or device 100. The actions of the method 400 may be performed by the speech activity detector 110 and/or the expression detector 112.

An action 402 comprises receiving directional audio signals representing sound from an environment, wherein each audio signal corresponds to one of multiple beam directions and each audio signal emphasizes sound from the corresponding beam direction.

An action 404 comprises analyzing the directional audio signals to identify a first of the directional audio signals having the highest level of speech presence among the multiple directional audio signals, as evaluated by the speech activity detector 110. For purposes of discussion, this signal will be referred to as the strongest signal.

An action 406 comprises determining whether the strongest signal corresponds to a beam direction in which an electronic or non-human sound source has been determined to be located, with reference to the information provided by the source detector 114 and the method 200 of FIG. 2. If the strongest signal does not correspond to a beam direction of a non-human sound source, an action 408 is performed of performing default expression detection on the strongest signal to detect utterances of the trigger expression. Default expression detection uses a default detection standard such as discussed with reference to the element 310 of FIG. 3.

If the strongest signal does correspond to a beam direction of a non-human sound source, an action 410 is performed, comprising performing strict expression detection on the strongest signal to detect utterances of the trigger expression represented by the strongest signal. Strict expression detection uses a more stringent detection standard such as discussed with reference to the element 312 of FIG. 3. In addition, an action 412 is performed of analyzing the directional audio signals to identify a second of the directional audio signals representing the second highest level of speech presence among the multiple directional audio signals, as evaluated by the speech activity detector 110. For purposes of discussion, this signal will be referred to as the second strongest signal. An action 414 is then performed, comprising performing default expression detection on the second strongest signal to detect utterances of the trigger expression represented by the second strongest signal.

The strict expression detection of the action 410 may comprise analyzing the strongest directional audio signal to produce a confidence score indicating a likelihood that a trigger expression is represented in the strongest audio signal and comparing the score to a first threshold to detect that the trigger expression has been spoken. The default expression detection of the action 408 may comprise analyzing the strongest directional audio signal to produce a confidence score indicating a likelihood that a trigger expression is represented in the strongest audio signal and comparing the score to a second threshold to detect that the trigger expression has been spoken, wherein the first threshold is greater than the second threshold. The default expression detection of the action 414 may comprise analyzing the second strongest directional audio signal to produce a score indicating a likelihood that a trigger expression is represented in the second strongest audio signal and comparing the score to the second threshold to detect that the trigger expression has been spoken.

Alternatively, the strict expression detection of the action 410 may comprise any one or more of the stringent or strict detection algorithms described above, while the default expression detection may comprise a less strict or default detection algorithm.

FIG. 5 illustrates an example method 500 that may be performed in some embodiments to subtract interfering audio from either or both of the strongest directional audio signal and the second strongest directional audio signal when the interfering audio comprises identifiable audio content produced by the non-human sound source.

An action 502 comprises identifying the content being played or produced by the non-human sound source. For example, the audio system or device 100 may have access to one or more repositories or sources of audio content that are playing on a media player. The sources may comprise online repositories, online streaming services, over-the-air (OTA) broadcasts, user libraries, etc. In certain embodiments, the sources may be relatively comprehensive, and may include a substantial portion of all content items that are available to large numbers of users.

The system or device may use one or more of several different techniques to identify the audio content that is currently being played by the non-human sound source. Upon identifying the interfering audio content, the system or device obtains the same content from an available source and uses the obtained content as a reference signal in an interference cancellation process 504 that suppresses or removes the content from the directional audio signal. For example, an estimated presence of the content in the directional audio signal may be cancelled or subtracted from the directional audio signal.

In certain situations, the audio content being played by a non-human source such as a media player can be identified by communicating with and querying the media player or an associated online service. In some cases, for example, an online media service providing streaming audio to the media player can be queried to identify the audio content.

In other situations, system or device may analyze the directional audio signal to create a signature or fingerprint of a portion of currently playing audio content. The created signature or fingerprint may then be compared to signatures or fingerprints of known and available reference content items to identify which of the reference content items is currently playing. Reference content items can be obtained or accessed from multiple content services, repositories, and sources, including broadcast sources such as Internet streaming services and over-the-air or cable broadcast networks. Sources may also include personal media libraries of users, online or network-based public sources such as media sharing services, social media sites or streams, for-purchase media services, on-demand media services, subscription media services, etc.

The action 504 of subtracting the content from the directional audio signal may be implemented by an finite impulse response (FIR) filter that effectively determines a temporal alignment of the reference content with the directional audio signal and to provide a time-aligned estimate of the presence of the content in the directional audio signal for subtraction from the directional audio signal.

Figure 6:
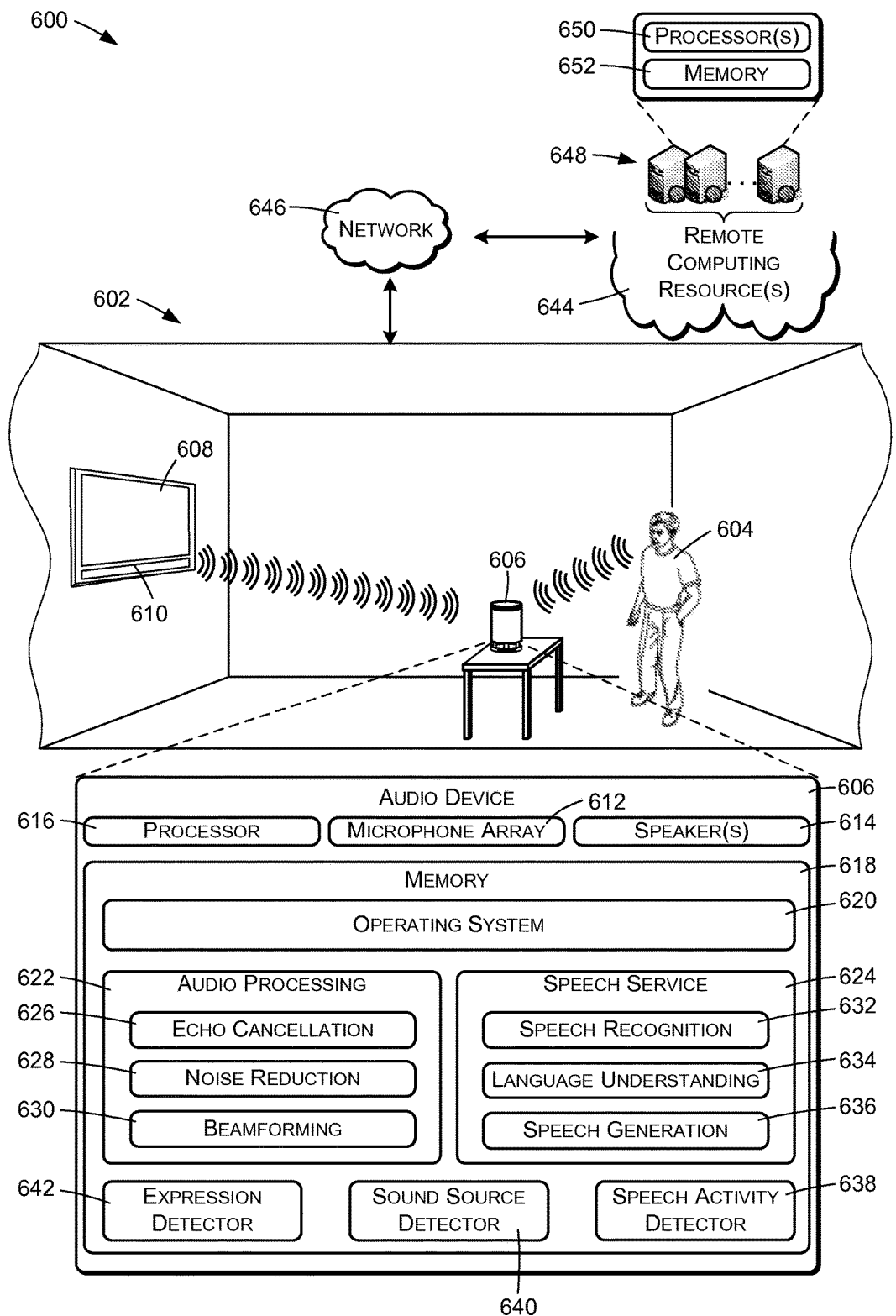
FIG. 6 is a diagram of an illustrative voice interaction computing architecture in which the described techniques may be implemented.

FIG. 6 shows an illustrative voice interaction computing architecture 600 set in an environment 602, such as a home environment, that includes a user 604. The architecture 600 includes an electronic, voice-controlled audio device 606 with which the user 604 may interact and which may implement the techniques described above. The environment 602 includes a television 608 as an example of an electronic, non-human sound source. The sound source in this example is located in a different radial direction than the user 604 relative to the voice-controlled audio device 606, although as the user 604 moves he or she may at times be positioned in the same radial direction as the television 608. The television 608 has a loudspeaker 610 that produces electronically generated sound that may include speech.

The audio device 606 has a microphone array 612 and one or more audio loudspeakers 614 to facilitate audio interactions with the user 604 and/or other users. The microphone array 612 produces microphone audio signals representing audio from the environment 602 such as sounds uttered by the user 604. The microphone audio signals produced by the microphone array 612 may comprise directional audio signals or may be used to produce directional audio signals, where each of the directional audio signals emphasizes audio from a different radial direction relative to the microphone array 612.

The audio device 606 includes control logic, which may comprise a processor 616 and memory 618. The processor 616 may include multiple processors and/or a processor having multiple cores. The memory 618 may contain applications and programs in the form of instructions that are executed by the processor 616 to perform acts or actions that implement desired functionality of the audio device 606, including the functionality specifically described herein. The memory 618 may be a type of computer storage media and may include volatile and nonvolatile memory. Thus, the memory 618 may include, but is not limited to, RAM, ROM, EEPROM, flash memory, or other memory technology.

The audio device 606 may have an operating system 620 that is configured to manage hardware and services within and coupled to the audio device 606. In addition, the audio device 606 may include audio processing components 622 and speech processing components 624.

The audio processing components 622 may include functionality for processing microphone audio signals generated by the microphone array 612 and/or output audio signals provided to the loudspeaker 614. As an example, the audio processing components 622 may include an acoustic echo cancellation or suppression component 626 for reducing acoustic echo generated by acoustic coupling between the microphone array 612 and the loudspeaker 614. The audio processing components 622 may also include a noise reduction component 628 for reducing noise in received audio signals, such as elements of microphone audio signals other than user speech.

The audio processing components 622 may include one or more audio beamformers or beamforming components 630 that are configured to generate directional audio signals that are focused in different directions. More specifically, the beamforming components 630 may be responsive to spatially separated microphone elements of the microphone array 612 to produce audio signals that emphasize sounds originating from different areas of the environment 602 or from different directions relative to the audio device 606.

The speech processing components 624 receive one or more directional audio signals that have been processed by the audio processing components 622 and perform various types of processing in order to understand the intent expressed by human speech. The speech processing components 624 may include an automatic speech recognition (ASR) component 632 that recognizes human speech in the received audio signal. The speech processing components 624 may also include a natural language understanding (NLU) component 634 that is configured to determine user intent based on recognized speech of the user 604.

The speech processing components 624 may also include a text-to-speech or speech generation component 636 that converts text to audio for generation at the loudspeaker 614.

The audio device 606 may include a speech or voice activity detector (VAD) 638 that functions as described above to detect which of the directional audio signals have the strongest and second strongest presence of speech or human voice. The audio device 606 may include a sound source detector 640 that functions as described above to determine the directions of non-human sound sources relative to the device 606. The audio device 606 may also include an expression detector 642 as described above to detect user utterances of a trigger expression.

In certain embodiments, the primary mode of user interaction with the audio device 606 may be through speech. For example, the audio device 606 may receive spoken commands from the user 604 and provide services in response to the commands. The user 604 may speak a predefined trigger expression (e.g., "Awake"), which may be followed by instructions or directives (e.g., "I'd like to go to a movie. Please tell me what's playing at the local cinema."). Provided services may include performing actions or activities, rendering media, obtaining and/or providing information, providing information via generated or synthesized speech via the audio device 606, initiating Internet-based services on behalf of the user 604, and so forth.

In some instances, the audio device 606 may operate in conjunction with or may otherwise utilize computing resources 644 that are remote from the environment 602. For instance, the audio device 606 may couple to the remote computing resources 644 over a network 646. As illustrated, the remote computing resources 644 may be implemented as one or more servers or server devices 648. The remote computing resources 644 may in some instances be part of a network-accessible computing platform that is maintained and accessible via a network 646 such as the Internet. Common expressions associated with these remote computing resources 644 may include "on-demand computing", "software as a service (SaaS)", "platform computing", "network-accessible platform", "cloud services", "data centers", and so forth.

Each of the servers 648 may include processor(s) 650 and memory 652. The servers 648 may perform various functions in support of the audio device 606, and may also provide additional services in conjunction with the audio device 606. Furthermore, one or more of the functions described herein as being performed by the audio device 606 may be performed instead by the servers 648, either in whole or in part. As an example, the servers 648 may in some cases provide the functionality attributed above to the speech processing components 624.

The audio device 606 may communicatively couple to the network 646 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 646 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

Although the audio device 606 is described herein as a voice-controlled or speech-based interface device, the techniques described herein may be implemented in conjunction with various different types of devices, such as telecommunications devices and components, hands-free devices, entertainment devices, media playback devices, and so forth.

Although the subject matter has been described in language specific to certain features, it is to be understood that the subject matter defined in the appended claims is not necessarily limited to the specific features described. Rather, the specific features are disclosed as illustrative forms of implementing the claims.

The invention claimed is:

1. A system comprising:
   a microphone array configured to produce microphone audio signals;
   an audio beamformer configured to process the microphone audio signals to produce directional audio signals, wherein a first directional audio signal of the directional audio signals corresponds to a first direction with respect to the microphone array and wherein a second directional audio signal of the directional audio signals corresponds to a second direction with respect to the microphone array, wherein the first directional audio signal and the second directional audio signal emphasize sound from the first direction and the second direction, respectively;
   a speech activity detector configured to analyze one or more frequency characteristics of the first directional audio signal and the second directional audio signal to determine a first level of speech presence and a second level of speech presence occurring in the first direction and the second direction, respectively, over time;

a source detector configured to analyze the first level of speech presence and the second level of speech presence occurring over a past time period to determine that an electronic source of sound is located in the first direction or the second direction; and an expression detector configured to perform actions comprising:
identifying the first direction where a first occurring level of speech presence is a highest level of speech presence;
determining that the first direction corresponds to a direction in which the electronic source of sound is located;
identifying the second direction where a second occurring level of speech presence is a second highest level of speech presence;
analyzing the first directional audio signal corresponding to the first direction to produce a first score indicating a first likelihood that a trigger expression is represented in the first directional audio signal;
analyzing the second directional audio signal corresponding to the second direction to produce a second score indicating a second likelihood that the trigger expression is represented in the second directional audio signal;
comparing the first score to a first threshold;
comparing the second score to a second threshold, wherein the second threshold is less than the first threshold;
determining that (i) the first score is greater than the first threshold or (ii) the second score is greater than the second threshold;
concluding that the trigger expression has been uttered; and
performing speech recognition on subsequent speech, based at least in part on the trigger expression.

2. The system of claim 1, wherein the source detector is further configured to determine that the electronic source of sound is located in the first direction by performing actions comprising:
determining a first range of frequencies of the first directional audio signal corresponding to the first direction; and
determining that the first range of frequencies is at least partially outside a second range of frequencies, wherein the second range of frequencies corresponds to frequencies of human speech.

3. The system of claim 1, wherein the source detector is further configured to determine that the electronic source of sound is located in the first direction by determining that the first level of speech presence corresponding to the first direction has exceeded a level threshold for at least a threshold amount of time during the past time period.

4. The system of claim 1, wherein the speech activity detector is configured to perform actions comprising:
determining one or more features of the first directional audio signal; and
comparing the one or more features to one or more reference signals that are known to contain human speech.

5. The system of claim 1, wherein analyzing the first directional audio signal to produce the first score comprises:
creating an acoustic model of an utterance represented by the first directional audio signal; and
comparing the acoustic model to one or more reference acoustic models that correspond to the trigger expression.

6. A processor-implemented method, comprising:
receiving, from one or more microphones, a plurality of audio signals, wherein the plurality of audio signals are processed by an audio beamformer to produce directional audio signals, wherein a first audio signal of the directional audio signals corresponds to a first direction with respect to the one or more microphones and wherein a second audio signal of the directional audio signals corresponds to a second direction with respect to the one or more microphones, wherein the first audio signal and the second audio signal emphasize sound from the first direction and the second direction, respectively;
identifying the first direction as an identified direction in which a non-human sound source is located;
analyzing the first audio signal to identify a representation of speech;
determining that the first audio signal corresponds to the identified direction in which the non-human sound source is located;
selecting a first standard to analyze the first audio signal based at least in part on the first audio signal corresponding to the identified direction of the non-human sound source;
analyzing the first audio signal using the first standard to detect an utterance of a trigger expression;
analyzing the second audio signal using a second standard to detect the utterance of the trigger expression, wherein the first standard includes (i) a first threshold that is greater than a second threshold associated with the second standard or (ii) a first detection algorithm that is different than a second detection algorithm associated with the second standard; and
receiving, from the one or more microphones, a third audio signal including subsequent speech for performing subsequent speech recognition, based at least in part on the utterance of the trigger expression.

7. The processor-implemented method of claim 6, further comprising:
producing a first score indicating a first likelihood that the trigger expression is represented by the first audio signal;
comparing the first score to the first threshold;
producing a second score indicating a second likelihood that the trigger expression is represented by the second audio signal; and
comparing the second score to the second threshold.

8. The processor-implemented method of claim 7, wherein producing the first score comprises:
creating an acoustic model of the utterance represented by the first audio signal; and
comparing the acoustic model to one or more reference acoustic models that correspond to the trigger expression.

9. The processor-implemented method of claim 6, wherein:
analyzing the first audio signal using the first standard comprises performing expression detection in accordance with the first detection algorithm; and
analyzing the second audio signal using the second standard comprises performing expression detection in accordance with the second detection algorithm.

10. The processor-implemented method of claim 9, wherein the first detection algorithm comprises analyzing the first audio signal to detect at least two utterances of the trigger expression within a particular time period to determine a valid utterance of the trigger expression.

11. The processor-implemented method of claim 9, wherein the first detection algorithm comprises analyzing the first audio signal to detect the utterance of the trigger expression after a time period during which speech is not detected.

12. The processor-implemented method of claim 6, wherein identifying the first direction as the identified direction further comprises determining that the first audio signal represents speech during at least a threshold amount of time during a past time period.

13. The processor-implemented method of claim 6, wherein identifying the first direction as the identified direction further comprises determining that the first audio signal has audio frequencies outside of a range of spoken speech frequencies.

14. The processor-implemented method of claim 6, wherein identifying the first direction as the identified direction further comprises receiving an indication from a user that the non-human sound source is located in the first direction.

15. The processor-implemented method of claim 6, wherein identifying the first direction as the identified direction further comprises receiving an indication from a user that the non-human sound source is located in a direction corresponding to the position of the user.

16. The processor-implemented method of claim 6, wherein analyzing the first audio signal to identify the representation of speech comprises:
  determining one or more features of the first audio signal; and
  comparing the one or more features to one or more reference signals that are known to contain human speech.

17. A processor-implemented method, comprising:
  receiving, from one or more microphones, a plurality of audio signals, wherein the plurality of audio signals are processed by an audio beamformer to produce directional audio signals, wherein a first audio signal of the directional audio signals corresponds to a first area of an environment with respect to the one or more microphones and wherein a second audio signal of the directional audio signals corresponds to a second area of the environment with respect to the one or more microphones, wherein the first audio signal and the second audio signal emphasize sound from the first area of the environment and the second area of the environment, respectively;
  determining that the first audio signal represents sound generated by a non-human sound source;
  selecting a first standard to analyze the first audio signal based at least in part on the first audio signal representing the sound generated by the non-human sound source;
  analyzing the first audio signal using the first standard to detect an utterance of a trigger expression;
  analyzing the second audio signal using a second standard to detect the utterance of the trigger expression, wherein the first standard includes (i) a first threshold that is greater than a second threshold associated with the second standard or (ii) a first detection algorithm that is different than a second detection algorithm associated with the second standard; and
  receiving, from the one or more microphones, subsequent speech for performing subsequent speech recognition, based at least in part on the utterance of the trigger expression.

18. The processor-implemented method of claim 17, further comprising:
  producing a first score indicating a first likelihood that the trigger expression is represented by the first audio signal;
  comparing the first score to the first threshold;
  producing a second score indicating a second likelihood that the trigger expression is represented by the second audio signal; and
  comparing the second score to the second threshold.

19. The processor-implemented method of claim 17, further comprising:
  determining that the trigger expression is represented in the first audio signal using the first detection algorithm; and
  determining that the trigger expression is represented in the second audio signal using the second detection algorithm,
  wherein the second detection algorithm is a default detection algorithm.

20. The processor-implemented method of claim 17, wherein determining that the first audio signal represents sound generated by the non-human sound source comprises determining that the first audio signal represents speech during at least a threshold amount of time during a past time period.

21. The processor-implemented method of claim 17, wherein determining that the first audio signal represents sound generated by the non-human source comprises determining that the first audio signal has audio frequencies outside of a range of human speech frequencies.

22. The processor-implemented method of claim 17, further comprising:
  accessing a database including a plurality of audio content;
  identifying audio content of the plurality of audio content corresponding to the sound produced by the non-human sound source; and
  canceling the audio content from the first audio signal.

23. The processor-implemented method of claim 6, wherein identifying the first direction as the identified direction further comprises:
  transmitting an instruction to an electronic device instructing the electronic device to produce an identifiable sound; and
  detecting the identifiable sound from the first direction.

* * * * *